United States Patent
Maeng

(10) Patent No.: US 11,887,104 B1
(45) Date of Patent: *Jan. 30, 2024

(54) MOBILE WALLET WITH OFFLINE PAYMENT

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

(*) Notice: Subject to any disclaimer, the term of this patent is extended or adjusted under 35 U.S.C. 154(b) by 245 days.

This patent is subject to a terminal disclaimer.

(21) Appl. No.: 17/458,965

(22) Filed: Aug. 27, 2021

Related U.S. Application Data

(63) Continuation of application No. 15/139,223, filed on Apr. 26, 2016, now Pat. No. 11,107,066.

(51) Int. Cl.
    *G06Q 20/36* (2012.01)
    *G06Q 20/32* (2012.01)
    *G06Q 20/20* (2012.01)

(52) U.S. Cl.
    CPC ........... *G06Q 20/36* (2013.01); *G06Q 20/202* (2013.01); *G06Q 20/3226* (2013.01)

(58) Field of Classification Search
    CPC ... G06Q 20/36; G06Q 20/202; G06Q 20/3226
    See application file for complete search history.

(56) References Cited

U.S. PATENT DOCUMENTS

| | | | |
|---|---|---|---|
| 8,380,177 B2 | 2/2013 | Laracey | |
| 8,924,292 B1 | 12/2014 | Ellis | |
| 2013/0151405 A1 | 6/2013 | Head et al. | |
| 2013/0173474 A1* | 7/2013 | Ranganathan | G06Q 20/0655 705/67 |
| 2013/0179281 A1 | 7/2013 | White et al. | |
| 2013/0311313 A1 | 11/2013 | Laracey | |
| 2014/0006273 A1* | 1/2014 | Gopinath | G06Q 20/10 705/40 |
| 2014/0279403 A1 | 9/2014 | Baird et al. | |
| 2014/0289403 A1* | 9/2014 | Jin | H04L 43/0811 709/224 |
| 2014/0372300 A1 | 12/2014 | Blythe | |

(Continued)

OTHER PUBLICATIONS

"U.S. Appl. No. 15/139,223, Advisory Action dated Jun. 28, 2019", 4 pgs.

(Continued)

*Primary Examiner* — Peter Ludwig
*Assistant Examiner* — Reva R Moore
(74) *Attorney, Agent, or Firm* — SCHWEGMAN LUNDBERG & WOESSNER, P.A.

(57) ABSTRACT

Various examples are directed to systems and methods for processing offline payments from a mobile wallet. A computing system may receive, from a financial institution system, an authentication request message comprising a first offline token. The computing system may determine that the mobile wallet application is not online and determine that the first offline toke comprises first offline token data that matches the first offline token reference data. The computing system may send to the financial institution system a first authentication message indicating that the first offline token is associated with the mobile wallet application.

20 Claims, 10 Drawing Sheets

(56) References Cited

U.S. PATENT DOCUMENTS

| | | | | |
|---|---|---|---|---|
| 2015/0339667 | A1* | 11/2015 | Dua | G06Q 20/327 |
| | | | | 705/16 |
| 2016/0071094 | A1* | 3/2016 | Krishnaiah | G06Q 20/363 |
| | | | | 705/66 |
| 2016/0072638 | A1* | 3/2016 | Amer | F24F 11/62 |
| | | | | 398/106 |
| 2017/0193498 | A1* | 7/2017 | Metral | G06Q 20/326 |

OTHER PUBLICATIONS

"U.S. Appl. No. 15/139,223, Advisory Action dated Aug. 26, 2020", 3 pgs.

"U.S. Appl. No. 15/139,223, Final Office Action dated Apr. 4, 2019", 18 pgs.

"U.S. Appl. No. 15/139,223, Final Office Action dated Jun. 5, 2020", 22 pgs.

"U.S. Appl. No. 15/139,223, Non Final Office Action dated Oct. 7, 2020", 23 pgs.

"U.S. Appl. No. 15/139,223, Non Final Office Action dated Oct. 30, 2019", 20 pgs.

"U.S. Appl. No. 15/139,223, Non Final Office Action dated Nov. 6, 2018", 16 pgs.

"U.S. Appl. No. 15/139,223, Notice of Allowance dated Apr. 28, 2021", 14 pgs.

"U.S. Appl. No. 15/139,223, Response filed Jan. 7, 2021 to Non Final Office Action dated Oct. 7, 2020", 11 pgs.

"U.S. Appl. No. 15/139,223, Response filed Jan. 30, 2020 to Non Final Office Action dated Oct. 30, 2019", 11 pgs.

"U.S. Appl. No. 15/139,223, Response filed Mar. 6, 2019 to Non Final Office Action dated Nov. 6, 2018", 12 pgs.

"U.S. Appl. No. 15/139,223, Response filed Jun. 4, 2019 to Final Office Action dated Apr. 4, 2019", 10 pgs.

"U.S. Appl. No. 15/139,223, Response filed Jul. 2, 2019 to Advisory Action dated Jun. 28, 2019", 10 pgs.

"U.S. Appl. No. 15/139,223, Response filed Aug. 5, 2020 to Final Office Action dated Jun. 5, 2020", 11 pgs.

* cited by examiner

MOBILE WALLET WITH OFFLINE PAYMENT

PRIORITY APPLICATIONS

This application is a continuation of U.S. patent application Ser. No. 15/139,223, filed Apr. 26, 2016, the content of which is hereby incorporated by reference in its entirety.

TECHNICAL FIELD

Embodiments described herein generally relate to mobile wallets and, for example and without limitation, mobile wallets capable of making payments while offline.

BACKGROUND

Mobile wallets can allow consumers to make payments for products and services with mobile computing devices instead of cash, credit cards or checks.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
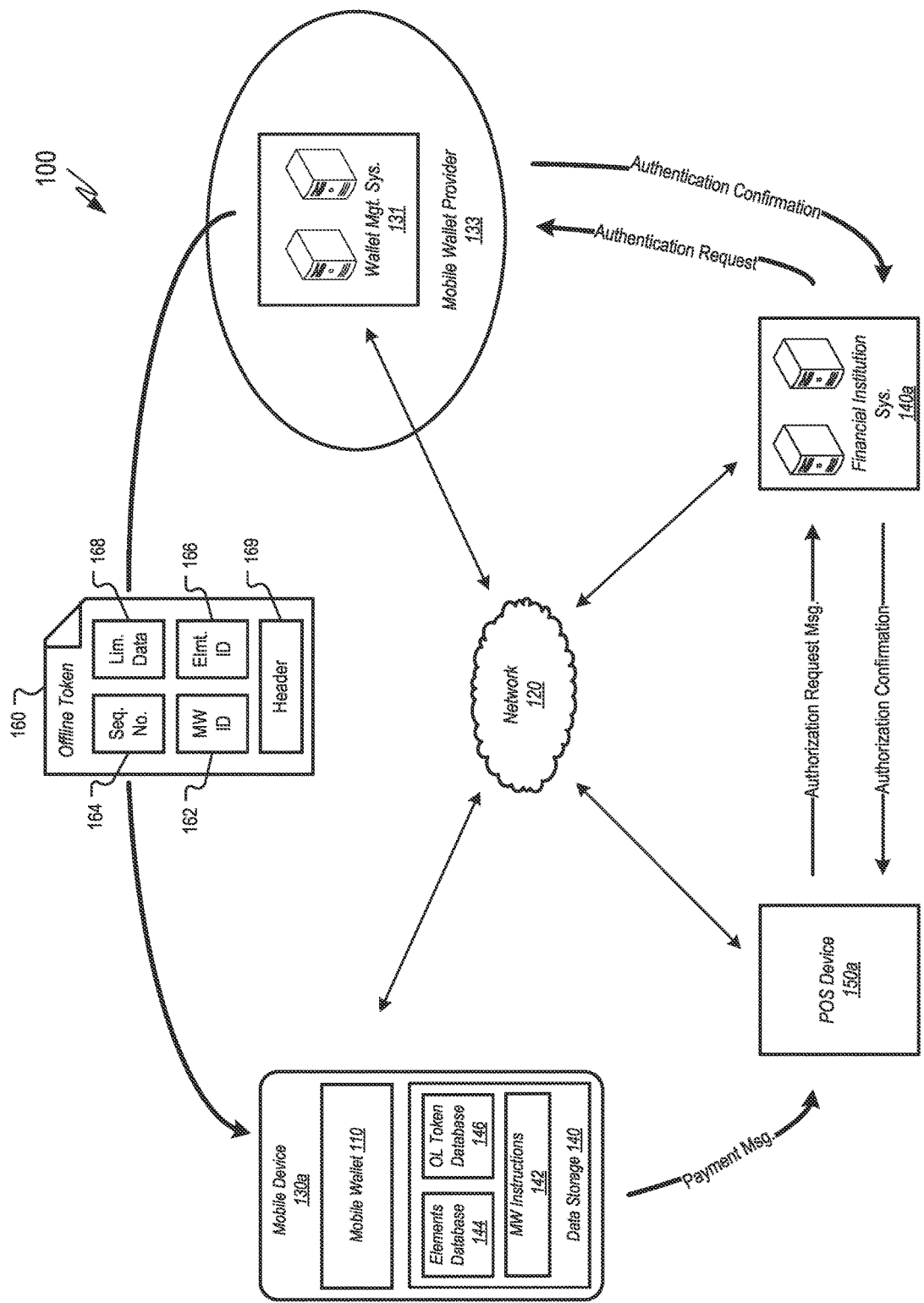
FIG. 1 is a diagram showing one example of an environment for mobile wallet transactions.

A user may utilize a mobile wallet to make a payment to a payee. In some examples, the payment is part of a purchase transaction. For example, the payee may be a grocery store, department store, or other vendor of goods or services. The mobile wallet may be executed by a mobile computing device. In some examples, the mobile wallet makes the payment by communicating with a point-of-sale (POS) device of the payee. The POS device may be a cash register, card reader, or other suitable device for receiving payment information. The mobile wallet may provide the POS device with element credentials for a mobile wallet element. The mobile wallet element (also referred to herein as an "element") may be an account of the user from which the payment will be made such as, for example, a credit card account, a debit account, a checking accounts, etc. The POS device may confirm the element credentials with a computer system of an issuer of the element. In some examples, the issuer is a financial institution such as a bank, credit card company, etc. If the credentials are confirmed, the POS device may accept the payment. The issuer may transfer a payment amount from the element to an account of the payee.

A mobile wallet may be configured to store element credentials locally at the mobile computing device. Storing the element credentials locally, however, can create security risks. For example, if the mobile computing device including the mobile wallet is lost or stolen, a thief may be able to use the element credentials to make fraudulent payments from the user's accounts. Alternatively, in some examples, a mobile wallet may be configured to operate in conjunction with a wallet management system. Element credentials may be stored remote from the mobile computing device at the wallet management system. To make a payment, the mobile wallet may retrieve the element credentials from the wallet management system or may instruct the wallet management system to provide the credentials directly to the POS device. This configuration may reduce security risks, however, it also makes it difficult for the mobile wallet to make payments when the mobile wallet is offline (e.g., not in communication with the wallet management system).

According to various examples described herein, a mobile wallet may utilize an offline token to make one or more purchases while the mobile wallet is offline. A wallet management system may generate the offline token and provide it to the mobile wallet. The offline token may comprise data describing the mobile wallet and data describing an element for payment. In some examples, the offline token may not include element credentials. The wallet management system may cryptographically sign all or a portion the offline token. In this way, the wallet management system may authenticate the offline token later, as described herein.

To make a payment while offline, the mobile wallet may provide the offline token to a POS device. The POS device may provide the offline token to a financial institution system associated with an issuer of the element indicated by the offline token and request authorization for the payment. The financial institution system may, in turn, authenticate the offline token with the mobile wallet management system, or other system that generated or is able to authenticate the offline token. Provided that the offline token is authenticated, the financial institution system may approve the payment.

FIG. 1 is a diagram showing one example of an environment 100 for mobile wallet transactions. The environment 100 includes a mobile computing device 130a, a financial institution system 140a, a wallet management system 131, and a POS device 150a.

The mobile computing device 130a may be any computing device suitable for executing a mobile wallet application 110. Example mobile computing devices 130a may include smart phones, tablet computers, laptop computers, smart watches, etc. The mobile wallet application 110 (sometimes referred to herein as a mobile wallet), may be executed by a processing unit of the mobile computing device 130a (not shown in FIG. 1). Additionally, the mobile computing device 130a may comprise data storage 140, which may store data for executing the mobile wallet 110 as described herein. For example, the data storage 140 may store mobile wallet instructions 142. The processing unit may execute the mobile wallet instructions to implement the mobile wallet 110. The data storage 140 may also store other data for the mobile wallet 110 including, for example, at an elements database 144 and an offline token database 146.

The elements database 144 may comprise data describing one or more elements of the mobile wallet 110. Elements may include payment service elements and non-payment service elements. Payment service elements be and/or may reference user accounts that can fund a payment including, for example, credit card accounts, debit accounts, checking accounts, etc. Non-payment service elements may be and/or reference, user accounts, memberships, etc. that do not include funds for making a payment. Examples of non-payment service wallet elements include employee cards, insurance cards, membership cards, and driver's licenses. Data stored at the elements database 144 may include, for example, identification data uniquely identifying an element, historical usage data describing past uses of an element by the mobile wallet 110, usage policy data describing when an element may be used, etc. The offline token database 146 may include offline tokens for one or more of the elements of the mobile wallet 110. In some examples, offline tokens may be stored at the elements database 144 and the offline token database may be omitted. Although features 144 and 146 are referred to as databases, those features may be implemented using any suitable data structure including, for example, a relational database, a table, a list, etc.

The wallet management system 131 is shown associated with a mobile wallet provider 133. The mobile wallet provider 133 may maintain the mobile wallet 110. The mobile wallet provider 133 may be a financial institution, software company, or any other organization that provides and maintains the mobile wallet 110. The wallet management system 131 may comprise one or more computing devices, such as servers, configured to operate as described herein. Computing devices making up the wallet management system 131 may be located at a single geographic location and/or may be distributed across multiple geographic locations. In some examples, the wallet management system 131 may be implemented in a "cloud computing" environment or as a "software as a service" (SaaS). For example, at least some of the operations of the wallet management system 131 may be performed by a group of computing devices, with these operations being accessible via a network, such as the network 120, and/or via one or more appropriate interfaces (e.g., an Application Program Interface (API)).

Configured may include here are described as being configured in

The financial institution system 140a may be implemented by a financial institution such as, for example, a financial institution at which the user holds an account (e.g., credit card account, checking account, etc.) associated with an element of the mobile wallet. The financial institution system 140a may comprise one or more computing devices, such as servers, configured to operate as described herein. Like the wallet management system 131, computing devices making up the wallet management system 131 may be implemented in cloud computing environment or as a SaaS.

The point of sale (POS) device 150a may be a device associated with a merchant or online store that accepts a payment from the mobile wallet 110. The POS device 150a may comprise a processing unit and various other computing components. In some examples, the POS device 150a may be or comprise a computing device configured, for example, according to one or more of the hardware or software architectures described herein. The POS device 150a may be configured to communicate with the mobile wallet 110 using any suitable contact or a contactless medium. In some examples, the POS device 150a may be configured to communicate with the mobile wallet 110 utilizing a short range communication medium such as, a Bluetooth connection, a Bluetooth LE connection, a Near Field Communications (NFC) connection, an infrared connection, etc.

The various components 130a, 110, 150a, 140a, 131 may be in communication with one another via a network 120. The network 120 may be or comprise any suitable network element operated according to any suitable network protocol. For example, one or more portions of network 120 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

FIG. 1 also shows an example offline token 160. The offline token 160 may comprise data that may be utilized herein by the various components of the environment 100 to make a payment to a payee while the mobile wallet 110 is offline. For example, the offline token 160 may comprise mobile wallet identification data 162. Mobile wallet identification data 162 may uniquely identify the mobile wallet 110. In some examples, the wallet identification data 162 may include a random set of alphanumeric characters that may be of a predetermined size (e.g., 128 bits). The offline token 160 may also comprise element identification data 166. The element identification data 166 may describe an element or elements of the mobile wallet 110 for making a payment. In some examples, the offline token 160 may be usable only to make payments from the element or elements described by the element identification data 166. In some examples, the element identification data 166 may describe a single element only.

Optionally, the offline token 160 comprises payment condition data 168. Payment condition data 168 may describe one or more limitations on the use of the offline token 160 for payments. Example payment conditions include, a limit on the number of payments for which the offline token 160 may be used, a geographic boundary condition indicating area in which the offline token 160 may be used, a payment amount limit, an expiration date, etc. In some examples, the offline token 160 also comprises a sequence number 164. The sequence number may indicate a sequence of the offline token 160 relative to other offline tokens 160 (e.g., other offline tokens generated for the mobile wallet 110 and/or for the same element or elements of the mobile wallet 110). The sequence number 164 may be any alphanumeric, binary, hexadecimal, or other suitable character that can capture a position of the offline token 160 in a sequence of offline tokens. The sequence number 164, in some examples, may be used by the wallet management system 131 to verify that offline tokens generated for a mobile wallet 110 are used in order.

FIG. 1 also shows a high-level description of a purchase made by the mobile wallet 110 utilizing the offline token 160. The wallet management system 131 and/or financial institution system 140a may generate the offline token 160. To generate the offline token 160, the wallet management system 131 may gather the data to be included in the offline token 160 (e.g., data 162, 164, 166, 168). The wallet management system 131 may cryptographically sign the data 162, 164, 166, 168 to generate the offline token 160. In some examples, the wallet management system 131 may also encrypt the data 162, 164, 166, 168, which may render the data unreadable to parties that lack a decryption key (e.g., a decryption key used to cryptographically sign the data and/or a complimentary key). Accordingly, in some examples, the offline token 160 may also comprise header data 169. Header data 169 may not be cryptographically signed and may include, for example, a Universal Resource Locator (URL) address or other indicator of the financial institution system 140a. In some examples, the header data 169 may also include an indication of the mobile wallet 110 and/or an element referenced by the offline token 160. In some examples, data provided in the clear (e.g., not cryptographically signed or otherwise encrypted) may also be included in the offline token 160 in an encrypted format. In this way, if a malicious party were to attempt to intercept the offline token 160 and attempt to modify the in-the-clear header data, the financial institution system 140a and/or wallet management system 131 may detect the discrepancy between the header data and the remainder of the offline token 160 and decline to authenticate. Additional details describing the generation and content of the offline token are provided herein, including at FIG. 5. The wallet management system 131 may provide the offline token 160 to the mobile wallet 110 (e.g., executing at the mobile computing device 130a).

The mobile wallet 110 may initiate a payment with a POS device 150a associated with a payee of the payment. For example, a user of the mobile wallet 110 (e.g., user 170 shown in FIG. 2) may request that the mobile wallet 110 provide the payment to the POS device 150a, and in any suitable manner. For example, the user 170 may access the mobile wallet 110 via an I/O device of the mobile computing device 130a to generate an instruction to the mobile wallet 110 to provide the payment to the POS device 150a. Also, in some examples, the user 170 may bring the mobile computing device 130a within range of a short range communication medium utilized by the POS device 150a, for example, by tapping the mobile computing device 130a on or near the POS device 150a, waving the mobile computing device 130a near the POS device 150a, etc.

The payment may be part of any suitable transaction. In some examples, the payment may be in return for goods and/or services provided to the user of the mobile wallet 110 by the payee. In some examples, the mobile wallet 110 may first determine whether it is online or otherwise in communication with the mobile wallet management system 131. If the mobile wallet 110 is in communication the mobile wallet management system 131, it may initiate the payment in conjunction with the mobile wallet management system 131. For example, the mobile wallet 110 may request that the wallet management system 131 provide an element credential either to the POS device 150a and/or to the mobile wallet 110. For example, the mobile wallet 110 may subsequently provide the element credential to the POS device 150a.

If the mobile wallet 110 is offline and/or not in communication with the wallet management system 131, it may proceed with the payment utilizing the offline token 160. The mobile wallet 110 may send to the POS device 150a a payment message comprising the offline token 160 and a payment amount. In some examples, the payment message may also indicate a mobile wallet payment element that is to be the source of the payment. In other examples, the offline token 160 may indicate a payment element for the payment, for example, at the header data 169.

In some examples, the offline token 160 may be used, as described herein, in lieu of element credentials. The mobile wallet 110 may send the payment message via the network 120 and/or via a short range communication medium. Upon receiving the offline token 160, the POS device 150a may identify the financial institution system 140a and send the system 140a a payment authorization request message. The financial institution system 140a may be selected based on the payment element identified by the offline token 160 and/or the payment message. For example, the financial institution system 140a may be associated with a financial institution hosting an account associated with the identified element. The payment authorization request message may comprise, for example, the offline token 160 and payment data describing the requested payment. Payment data may include, for example, amount data describing an amount of the requested payment.

The financial institution system 140a may receive the payment authorization request message, including the offline token 160. The financial institution system 140a may be associated with an issuer of the payment element for the payment. To determine whether to authorize the payment, the financial institution system 140a may send an authentication request message to the wallet management system 131. The authentication request message may comprise all or a portion of the offline token 160 and, in some examples, may also include payment data describing the requested payment. Some or all of the payment data included in the authentication request may have been received from the POS device 150a as part of the payment authorization request.

In response, the wallet management system 131 may authenticate the offline token 160. Authenticating the offline token 160 may include verifying, by the wallet management system 131, that the offline token 160 was generated by the wallet management system 131 for the mobile wallet 110. For example, the wallet management system 131 may verify the cryptographic signature made during the creation of the offline token 160 as described above. In some examples, the wallet management system 131 may determine whether the offline token data 162, 164, 166, 168 matches reference data stored at the wallet management system 131 for the offline token 160. The reference data may be a reference copy of the offline token 160 and/or a reference copy of constituent data making up the offline token 160 (e.g., data 162, 164, 166, 168, and/or 169 described above). For example, the wallet management system 131 may decrypt the offline token and compare its constituent data to reference copies.

If the offline token 160 is authenticated, the wallet management system 131 may send the financial institution system 140a an authentication confirmation message indicating that the requested payment has been authenticated. In response, the financial institution system 140a may determine that the requested payment is authorized. For example, the financial institution system 140a may transfer the payment amount indicated by the authorization request message from an account associated with the payment element to an account of the payee. In some examples, the financial institution system 140a may also send an authorization confirmation message to the POS device 150a indicating that the payment has been authorized.

Figure 2:
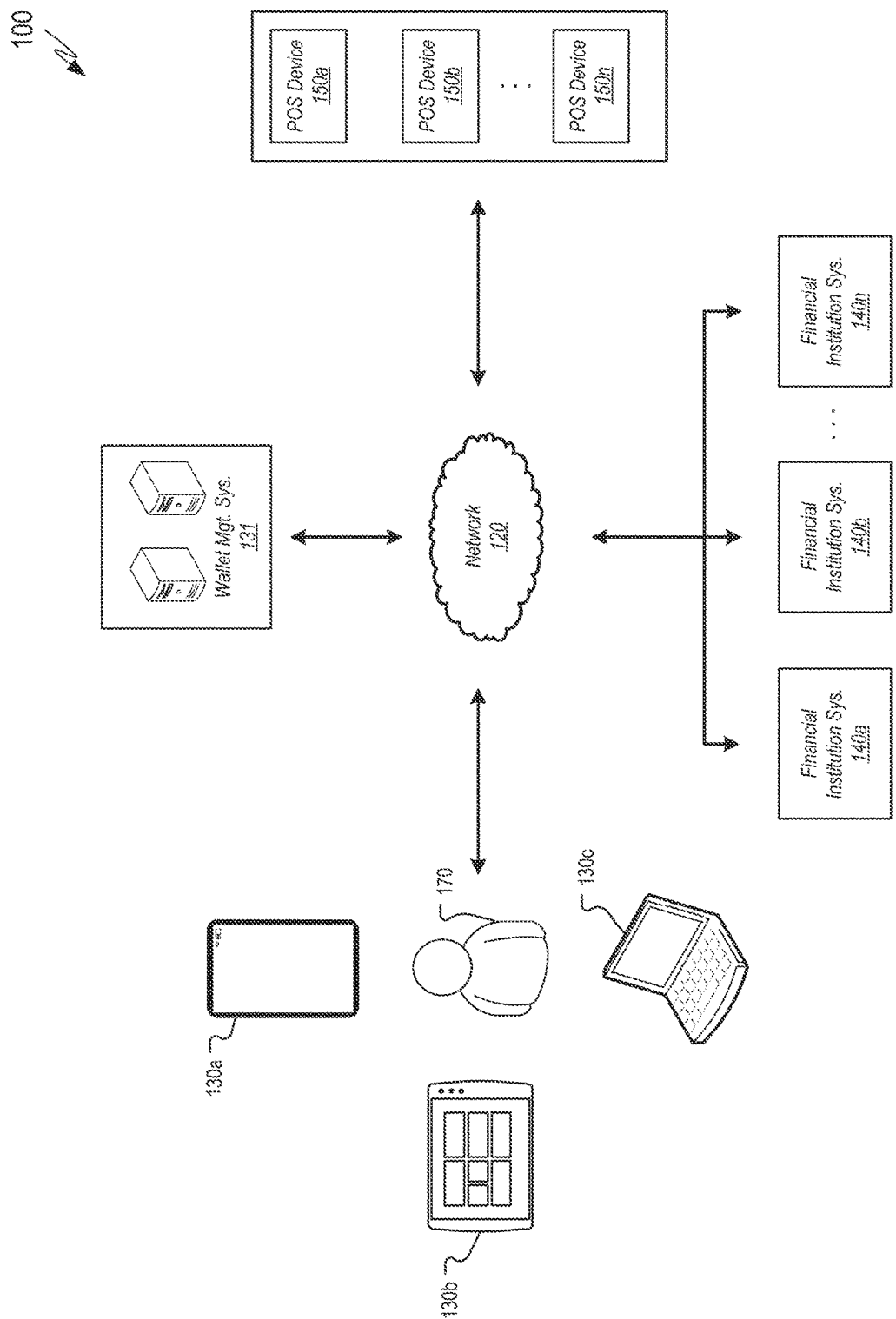
FIG. 2 is a diagram showing another example of the environment of FIG. 1 showing additional components.

FIG. 2 is a diagram showing another example of the environment 100 of FIG. 1 showing additional components. For example, FIG. 2 shows a user 170 and a number of mobile computing devices 130a, 130b, 130c that may be suitable for executing the mobile wallet 110. Mobile computing device 130a may be a mobile telephone. Mobile computing device 130b may be a tablet computer. Mobile computing device 130c may be a laptop computer. It will be appreciated, however, that various other types of mobile computing devices (not shown) may be configured to execute the mobile wallet 110.

FIG. 2 also shows a plurality of POS devices 150a, 150b, 150n. Although three POS devices 150a, 150b, 150n are shown, the environment 100 may include any suitable number of POS devices. Each POS device 150a, 150b, 150n may be associated with a payee, such as a merchant with a physical retail location (a "bricks and mortar" merchant), an online merchant, etc. In some examples, each POS device 150a, 150b, 150n may be associated with a different payee. In other examples, more than one of the POS device 150a, 150b, 150n may be associated with the same payee.

FIG. 2 also shows a plurality of financial institution systems 140a, 140b, 140n. Although three financial institution systems 140a, 140b, 140n are shown, any suitable number of financial institution systems 140a, 140b, 140n may be included in the environment 100. Financial institution systems 140a, 140b, 140n may be associated with one or more financial institutions, as described herein. In some examples, each financial institution system 140a, 140b, 140n may be associated with a different financial institution. In other examples, a single financial institution may be associated with multiple financial institution systems 140a, 140b, 140n.

Figure 3:
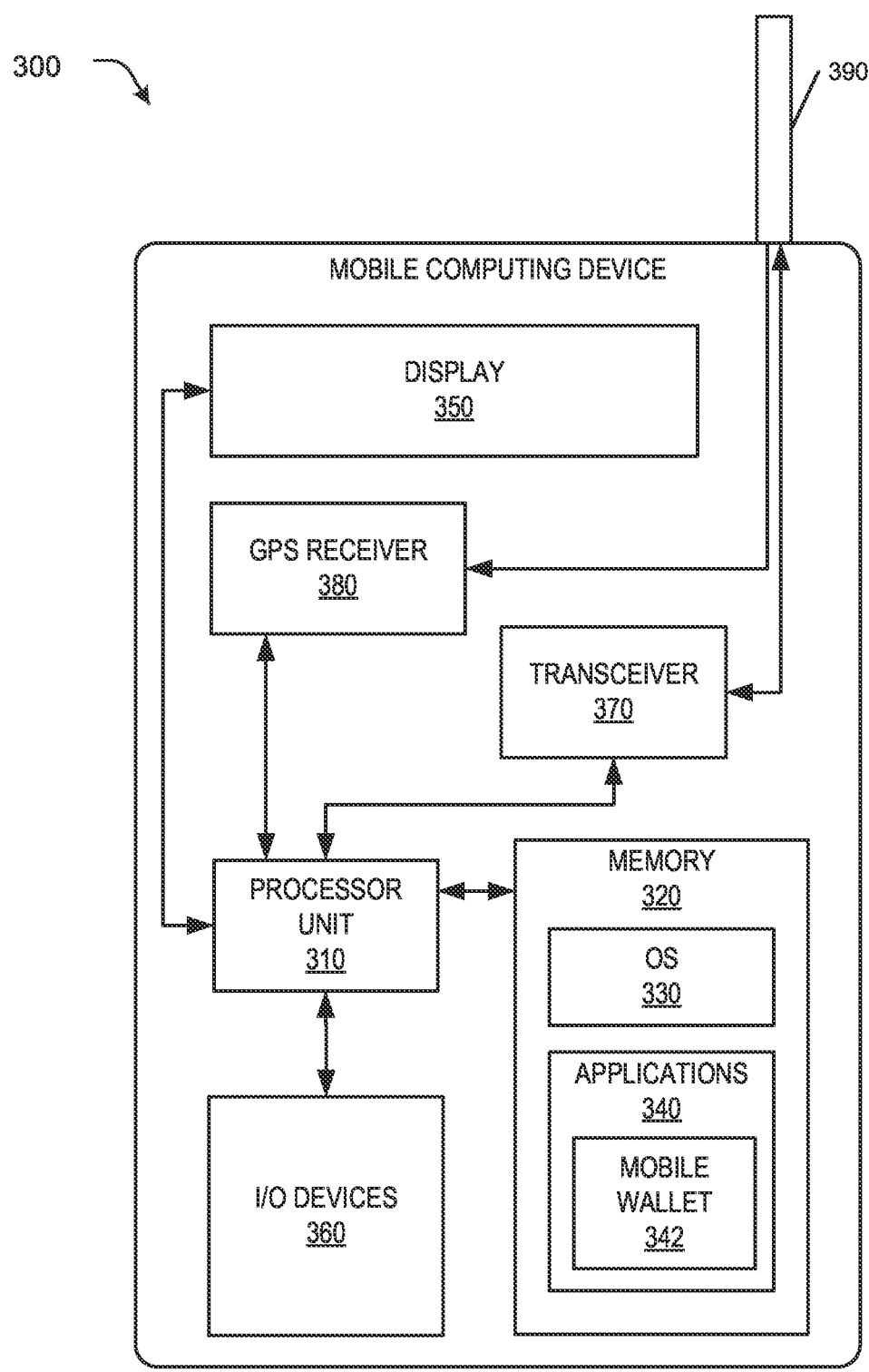
FIG. 3 is a block diagram illustrating a mobile computing device, according to an example embodiment.

FIG. 3 is a block diagram showing an example architecture 300 of a mobile computing device. Any of the mobile computing devices 130a, 130b, 130c, for example, may be implemented according to the architecture 300. The architecture 300 comprises a processor unit 310. The processor unit 310 may include one or more processors any of a variety of different types of commercially available processors suitable for mobile computing devices (for example, an XScale architecture microprocessor, a Microprocessor without Interlocked Pipeline Stages (MIPS) architecture processor, or another type of processor). A memory 320, such as a Random Access Memory (RAM), a Flash memory, or other type of memory or data storage, is typically accessible to the processor. The memory 320 may be adapted to store an operating system (OS) 330, as well as application programs 340, such as, for example, a mobile wallet application 342 that may operate in a manner similar to the mobile wallet application 110 described herein.

The processor unit 310 may be coupled, either directly or via appropriate intermediary hardware, to a display 350 and to one or more input/output (I/O) devices 360, such as a keypad, a touch panel sensor, a microphone, and the like. Similarly, in some embodiments, the processor 310 may be coupled to a transceiver 370 that interfaces with an antenna 390. The transceiver 370 may be configured to both transmit and receive cellular network signals, wireless data signals, or other types of signals via the antenna 390, depending on the nature of the mobile computing device implemented by the architecture 300. Although one transceiver 370 is shown, in some examples, the architecture 300 includes additional transceivers. For example, a wireless transceiver may be utilized to communicate according to an IEEE 802.11 specification, such as Wi-Fi and/or to a short range communication medium. Some short range communication mediums, such as NFC, may utilize a separate, dedicated transceiver. Further, in some configurations, a GPS receiver 380 may also make use of the antenna 390 to receive GPS signals.

Figure 4:
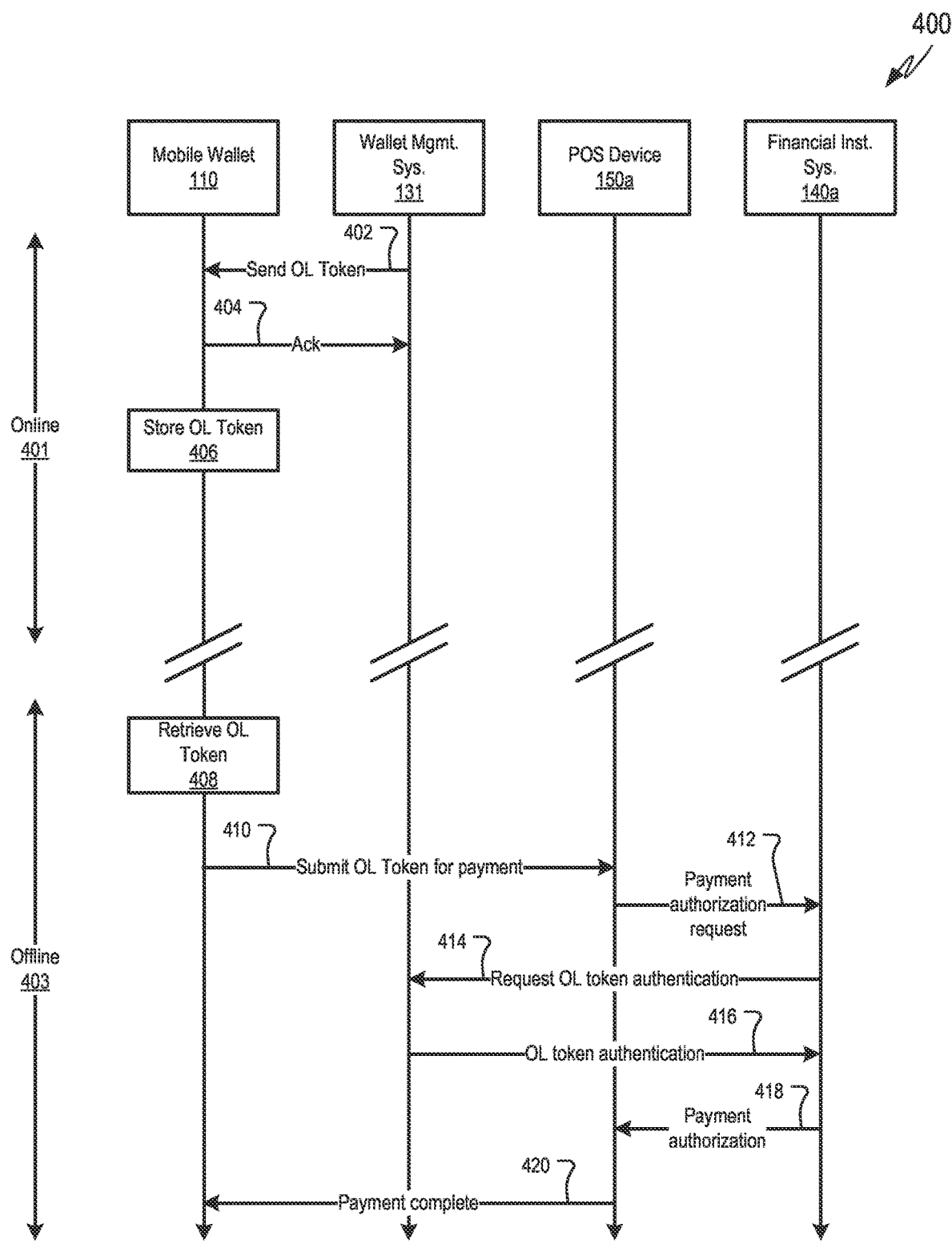
FIG. 4 is a timing diagram showing one example of a mobile wallet transaction utilizing an offline token.

FIG. 4 is a timing diagram showing one example of a mobile wallet transaction 400 utilizing an offline token. The transaction 400 includes the mobile wallet 110, the wallet management system 131, the POS device 150a, and the financial institution system 140a. In the timing diagram of FIG. 4, time passes from top to bottom. For example, messages and actions closer to the top of the timing diagram of FIG. 4 may occur before actions that are closer to the bottom. The transaction 400 shows an online portion 401 and an offline portion 403. During the online portion 401, the mobile wallet 110 is online. For example, when the mobile wallet 110 is online, the mobile computing device 130a, 130b, 130c executing the mobile wallet 110 may be in communication with the wallet management system 131. When the mobile wallet 110 is offline, the mobile computing device 130a, 130b, 130c executing the mobile wallet 110 may not be in communication with the wallet management system 131.

During the online portion 401, at action 402, the wallet management system 131 may produce and send an offline token, such as the offline token 160 shown in FIG. 1, to the mobile wallet 110. In other examples, the financial institution 140a produces the offline token and sends it to the wallet management system 141 that, in turn, sends the offline token to the mobile wallet 110. The offline token may be sent, for example, via the network 120. The wallet management system 131 may generate the offline token. Additional examples describing how the wallet management system 131 may generate the offline token are provided herein, for example, at FIG. 5 and the accompanying text. Optionally, at action 404, the mobile wallet 110 may send to the wallet management system 131 an acknowledgement message indicating that the mobile wallet 110 has received the offline token. The mobile wallet 110 may store the offline token at action 406.

Later, during the offline portion 403, the mobile wallet 110 may retrieve the offline token at action 408, for example, in response to an instruction from a user to provide a payment. In some examples, before retrieving the offline token, the mobile wallet 110 may determine that the mobile wallet 110 is offline. For example, if a user of the mobile wallet 110 requests a payment, the mobile wallet 110 may determine whether the mobile wallet is online or offline. If the mobile wallet 110 determines that it is offline, it may retrieve the offline token and proceed as indicated by the transaction 400. In some examples, when the mobile wallet 110 is online, it may communicate with the wallet management system 131 to request that the wallet management system 131 provide element credentials for the payment to the POS device 150a, directly or indirectly. Also, in some examples, the mobile wallet 110 may store multiple offline tokens (e.g., at the offline token database 146). Different offline tokens may correspond to different elements for payment. The mobile wallet 110 may select an element for making the requested payment and then submit, at action 410, an offline token associated with the selected element. The mobile wallet 110 may select the element automatically and/or based at least in part on feedback from the user.

At action 410, the mobile wallet 110 may submit the offline token to the POS device 150a. For example, the mobile wallet 110 may submit the offline token to the POS device 150a utilizing a short range communication medium.

The POS device 150a, upon receiving the offline token, may send a payment authorization request message to the financial institution system 140a at action 412. The payment authorization request message may comprise the offline token and payment data describing the requested payment such as, for example, an amount of the requested payment. In some examples, communications between the POS device 150a and the financial institution system 140a and between the financial institution system 140a and the wallet management system 131 may be conducted via the network 120.

The financial institution system 140a may be associated with a financial institution that issues and/or holds the element to be used for the payment. In some examples, the POS device 150a may identify the appropriate financial institution system 140a by examining the offline token. For example, a clear (e.g., unencrypted) header of the offline token may comprise data identifying the financial institution system 140a. In some examples, the mobile wallet 110 may provide the offline token with additional data identifying the financial institution system 140a.

At action 414, the financial institution system 140a may send an authentication request message to the wallet management system 131. The financial institution system 140a may identify the wallet management system 131 in any suitable manner. For example, a clear header of the offline token may identify the wallet management system 131. Also, in some examples, the mobile wallet 110 may provide data describing the wallet management system 131 with the offline token provided to the POS device 150a. Also, in some examples, the financial institution system 140a may comprise data associating the mobile wallet 110 or a user associated therewith with a particular wallet management system 131.

The authentication request message may include the offline token and, in some examples, includes payment data describing the requested payment. Based on the offline token and, in some examples, the payment data describing the requested payment, the wallet management system 131 may authenticate the offline token. Authenticating the offline token may involve determining that the offline token received by the wallet management system 131 is the same as, or equivalent to, the offline token send to the mobile wallet at action 402. In some examples, the wallet management system 131 may generate a reference copy of an offline token (e.g., at the time that the offline token is created). Authenticating the offline token may comprise comparing the offline token received at 414 to the reference copy of the offline token. Additional details describing how the wallet management system 131 may authenticate an offline token are provided herein, for example, at FIG. 6 and the accompanying text. For example, the wallet management system 131 may contact the mobile wallet 110 and/or otherwise determine whether the mobile wallet 110 is offline. If the wallet management system 131 determines that the mobile wallet is online (e.g., not offline), it may decline the authentication request. The financial institution may, in turn, deny the requested payment. This may prevent fraudulent use of the offline token by a third party.

In some examples, the wallet management system 131 may

If the offline token is authenticated, the wallet management system 131 may, at action 416, send an offline token authentication message to the financial institution system 140a. The offline token authentication message may comprise data indicating that the offline token is authenticated. Upon receiving the offline token authentication message, the financial institution system 140a may determine whether the requested payment is authorized. For example, the financial institution system 140a may determine whether an account balance or credit limit of the payment element is greater than the payment amount. Provided that the payment is authorized, the financial institution system 140a may send a payment authorization message 418 to the POS device 150a. The financial institution system 140a, in some examples, may also make a transfer from the indicated payment element to an account of the payee. Upon receiving the payment authorization message 418, the POS device may send a payment complete message to the mobile wallet 110 at action 420.

Figure 5:
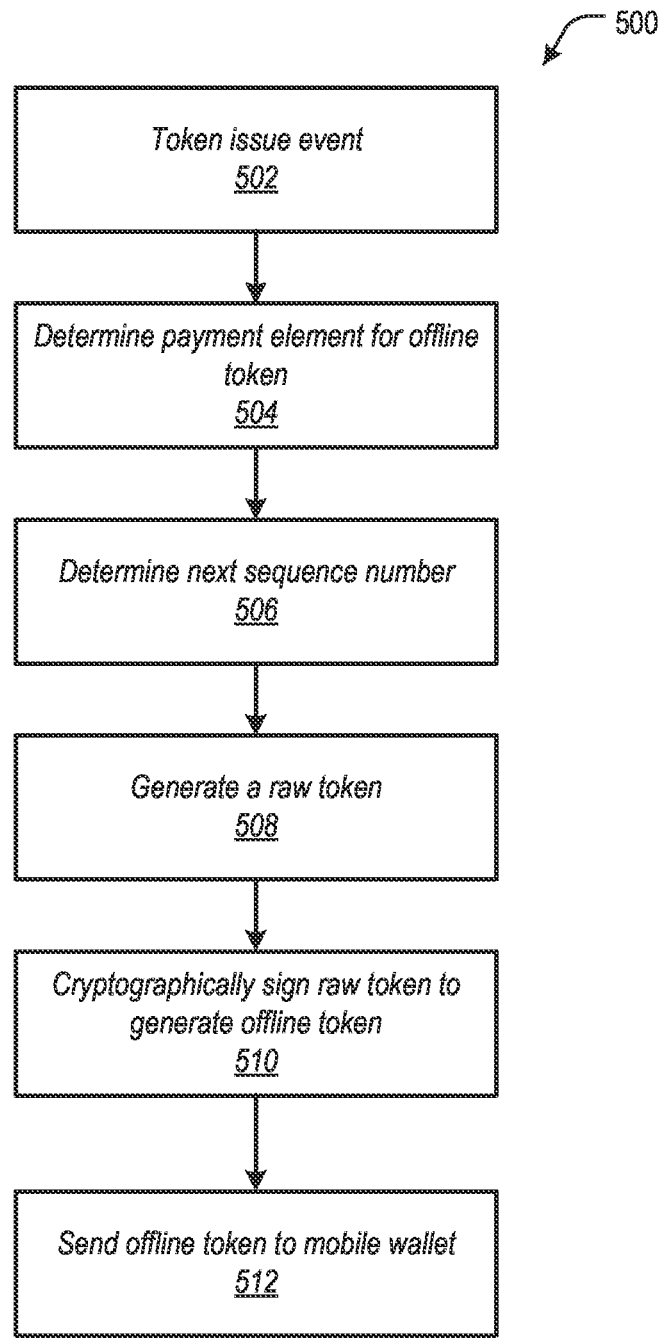
FIG. 5 is a flowchart showing one example of a process flow that may be executed by a wallet management system to generate an offline token.

FIG. 5 is a flowchart showing one example of a process flow 500 that may be executed by a wallet management system, such as the wallet management system 131, to generate an offline token. At action 502, a token issue event may occur. In some examples, the wallet management system may determine that a token issue event has occurred. In some examples, another component, such as the mobile wallet, may determine that a token issue event has occurred and may request that the wallet management system generate an offline token. A token issue event may be any suitable event that prompts the generation of an offline token. In some examples, a token issue event may occur when a mobile wallet is initialized for a user. Initializing a mobile wallet may be and/or include, downloading and/or installing the mobile wallet to the user's mobile user device, creating an account for the mobile wallet at the wallet management system 131, etc. In some examples, a token issue event may occur when a new payment element is added to the mobile wallet. For example, the wallet management system may generate and issue a new offline token enabling offline payments from the newly added element. In some examples, a token issue event may occur when a previous offline token is used. For example, a wallet management system may be configured to issue a new offline token to a mobile wallet when the mobile wallet uses a previous offline token. Also, for example, the wallet management system may be configured to generate one or more new offline tokens after the mobile wallet has used a threshold number of offline tokens and/or has less than a threshold number of offline tokens remaining. In some examples, the wallet management system may be configured to generate one or more new offline tokens after the mobile wallet has used a threshold number of offline tokens for a particular payment element, or has less than a threshold number of offline tokens remaining for that payment element. A token issue event, in some example, may be initiated by a financial institution system. For example, the financial institution system may request that the wallet management system issue a new offline token to the mobile wallet. In some examples, a token issue event may occur when the mobile wallet requests a new offline token.

At action 504, the wallet management system may determine a payment element or elements for the offline token. The payment element or elements may be indicated by the token issue event. For example, if the token issue event is the use of a previously-generated offline token, the element or elements for the new offline token may be the same as those for the previous offline token Also, in some examples, the element or elements for the offline token may be received as part of a request for the offline token from the mobile wallet, financial institution system, etc.

Optionally, at 506, the wallet management system may determine a sequence number for the offline token. The sequence number, as described herein, may indicate a sequence of the offline token relative to other tokens. The sequence may indicate, for example, an order in which the offline tokens are generated, a sequence in which the offline tokens are to be used, etc. In some examples, a mobile wallet may have a single sequence. The sequence number for an offline token for such a mobile wallet may indicate a sequence in which all offline tokens for the mobile wallet are generated, are to be used, etc. In other examples, a mobile wallet may have multiple sequences. For example, different sequences for a mobile wallet may correspond to offline tokens for different elements or combinations of elements. When the mobile wallet has a single sequence, selecting the next sequence number may comprise selecting the next unused number from the single sequence. When the mobile wallet has multiple sequences, selecting the next sequence number may comprise assigning the offline token to a sequence for the mobile wallet (e.g., based at least in part on an element or elements for the offline token) and selecting the next sequence number for the appropriate sequence.

At action 508, the wallet management system may generate a raw token. The raw token may comprise any suitable data structure and include data that will be included in the offline token. Example data that may be included in the raw token include, mobile wallet identification data describing the mobile wallet for which the offline token is generated and element identification data describing one or more payment elements for the offline token. Other example data that may be added to the raw token include the sequence number determined at action 506, and payment condition data. In some examples, header data may also be added to the raw token.

At action 510, the wallet management system may cryptographically sign all or part of the raw token to generate the offline token. The wallet management system may cryptographically sign the offline token in any suitable manner. In some examples, the wallet management system may utilize an asymmetric key pair comprising a public key and a private key. The wallet management system may encrypt the raw token with its private key, which is not shared. In this way, other parties (e.g., the financial institution system) may authenticate the resulting offline token by decrypting the offline token using the wallet management system's public key.

In examples where the wallet management system cryptographically signs the raw token using a private key, it may not be necessary for the financial institution system to send the resulting offline token to the wallet management system for authentication. For example, the financial institution system may be able to authenticate the offline token itself utilizing the wallet management system's public key. In other examples, the wallet management system may cryptographically sign the raw token utilizing a secret symmetric key. Accordingly, the wallet management system itself, or another party in possession of the secret symmetric key, may authenticate the offline token. In examples where the header data is added to the raw token before the cryptographic signing at action 510, the header data may not be signed (e.g., the header data may remain unencrypted or in the clear. In examples where the offline token includes header data and the header data is not included in the raw token, the wallet management system may add the header data after cryptographically signing the raw token. At action 512, the wallet management system may send the offline token to the mobile wallet.

Figure 6:
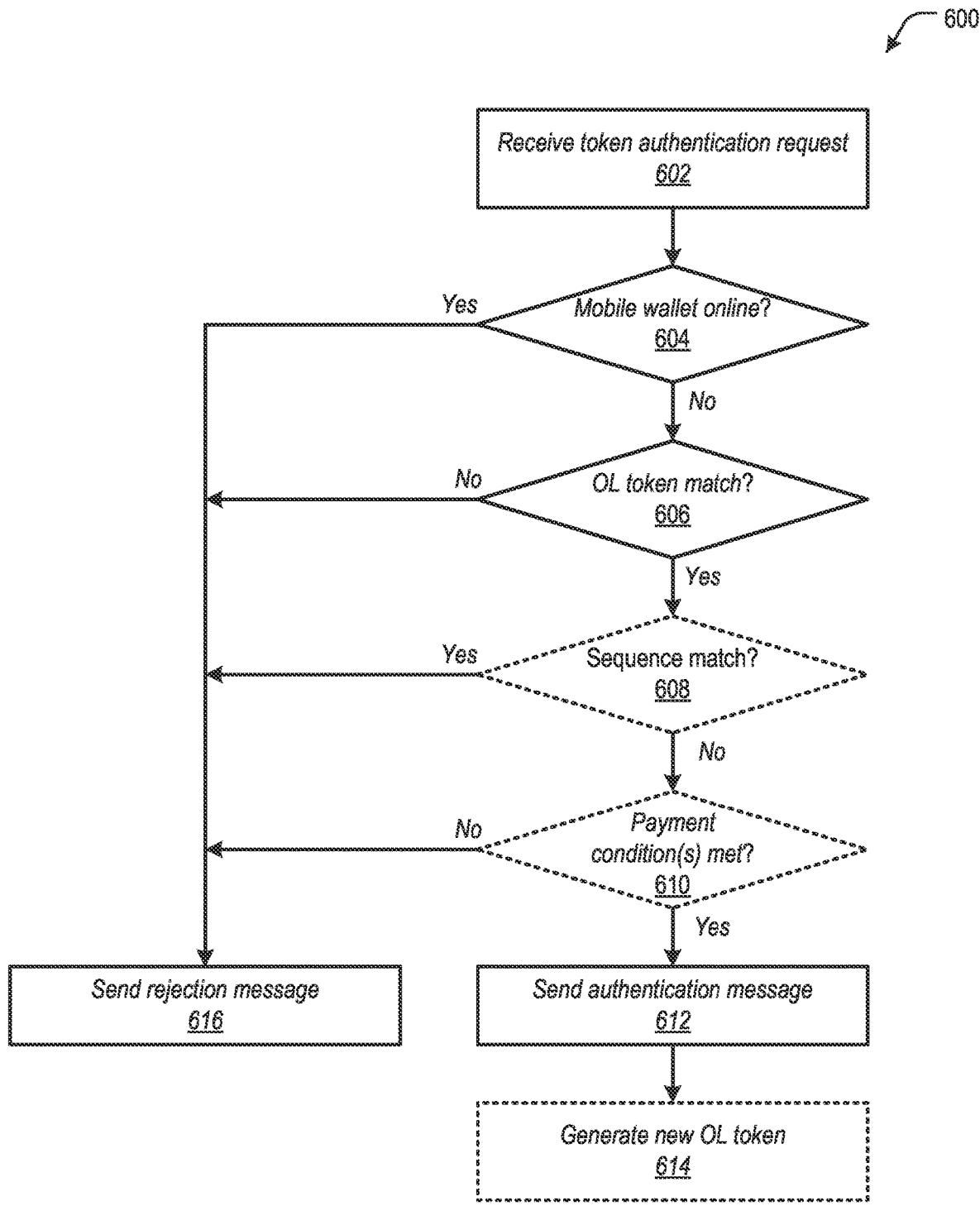
FIG. 6 is a flowchart showing one example of a process flow that may be executed by a wallet management system to authenticate an offline token.

FIG. 6 is a flowchart showing one example of a process flow 600 that may be executed by a wallet management system to authenticate an offline token. For example, the process flow 600 may be executed by the wallet management system 131 to authenticate an offline toke in the examples described herein. At action 602, the wallet management system may receive a token authentication request comprising an offline token and payment data. The token authentication request may be received from a financial institution system, for example, as described with respect to FIG. 4 and action 412.

At action 604, the wallet management system may determine if the mobile wallet is online. The wallet management system may use any suitable manner to determine if the mobile wallet is online. For example, the mobile wallet may be configured to provide the wallet management system with a periodic heartbeat message. When the wallet management system receives the periodic heartbeat message, it may generate a timestamp. To determine whether the mobile wallet is online, the wallet management system may check the time stamp of the most recently received heartbeat message. If more than a threshold time period has passed since the most recent heartbeat message was received, the wallet management system may determine that the mobile wallet is not online. In some examples, the wallet management may attempt to query the mobile wallet. If a response is received, the mobile wallet may be online. If no response is received before a timeout threshold has passed, the mobile wallet may not be online.

If the mobile wallet is online, then wallet management system may, at action 616, send to the financial institution a rejection message comprising data indicating that the offline token is not authenticated and/or that the payment should not proceed with the offline token. For example, if the mobile wallet is online, it may be able to contact the wallet management system directly to request that the wallet management system provide element credentials to cover the payment. Accordingly, it may not be necessary to use an offline token. If the mobile wallet is not online, the wallet management system may proceed as indicated.

At action 606, the wallet management system may determine if the offline token matches an offline token issued to the mobile wallet. For example, the wallet management system may compare the offline token received from the financial institution system with reference data stored at the wallet management system. The reference data may be, for example, a copy of the offline token, a raw (e.g., unencrypted) version of the offline token, etc. In some examples, determining an offline token match may comprise verifying a cryptographic signature of the offline token. For example, the wallet management system may decrypt the offline token utilizing its own public key and/or its own secret symmetric key. If the wallet management system determines that the offline token does not match the reference data or is otherwise not authenticated, it may send the rejection message at action 616. If the offline token is authenticated, the wallet management system may proceed as indicated.

Optionally, at action 608, the wallet management system may determine if a sequence number of the offline token matches the next expected sequence number. As described herein, the offline token may comprise a sequence number. In examples where offline tokens are to be used according to a sequence, the wallet management system may maintain a next expected sequence number. For example, the next expected sequence number may initially indicate a first offline token in the sequence. When that offline token is used, the wallet management system may increment the next expected sequence number. If the received offline token does not match the next expected sequence number, it may indicate that the mobile wallet has malfunctioned and/or that an offline token has been stolen. Accordingly, the wallet management system may proceed to send a rejection message at action 616. If the sequence number of the received offline token does match the next expected sequence number, the wallet management system may proceed as indicated.

Also optionally, at action 610, the wallet management system may determine if one or more payment conditions for the offline token are met. Payment conditions may be indicated, for example, by payment condition data included in the offline token. In some examples, payment condition data may not be included in the offline token. For example, payment condition data be stored at the wallet management system. An example payment condition is a threshold number of payments for which the offline token can be used. Another example payment condition is a geographic area in which the offline token may be used. Another example payment condition is a payment amount limitation. Another example payment condition is an expiration date for the offline token.

Another example payment condition may include determining whether a lost device message has been received for the mobile wallet. For example, if the user of a mobile wallet loses a mobile computing device storing one or more offline tokens, the user may notify the wallet management system, for example, by sending a lost mobile computing device message. The wallet management system may store the lost mobile computing device message in association with the mobile wallet. The wallet management system may check for a lost mobile computing device message associated with a mobile wallet before authenticating an offline token for the mobile computing device. For example, if a lost mobile computing device message has been received for a mobile wallet, the wallet management system may reject the authentication request. In some examples, the lost mobile computing device may also comprise data indicating a specific mobile computing device that has been lost. In this way, the wallet management system may identify specific offline tokens that were stored at the lost mobile computing device. Accordingly, the wallet management system may reject the authentication of offline tokens that were stored at the lost mobile computing device, but may potentially authenticate proper offline tokens that were not stored at the lost mobile computing device (e.g., offline tokens stored on other mobile computing devices at the time that the lost mobile computing device was lost, offline tokens issued after the lost mobile computing device was lost, etc.). If one or more payment conditions are not met, the wallet management system may send a rejection message at action 616. If all payment conditions are met, the wallet management system may proceed as indicated.

At action 612, the wallet management system may send an authentication message to the financial institution system indicating that the offline token is authenticated. As described above, in some examples, the use of an offline token may be a token issue event. Accordingly, and optionally, at action 614, the wallet management system may generate a new offline token, for example, as described above with respect to FIG. 5.

Figure 7:
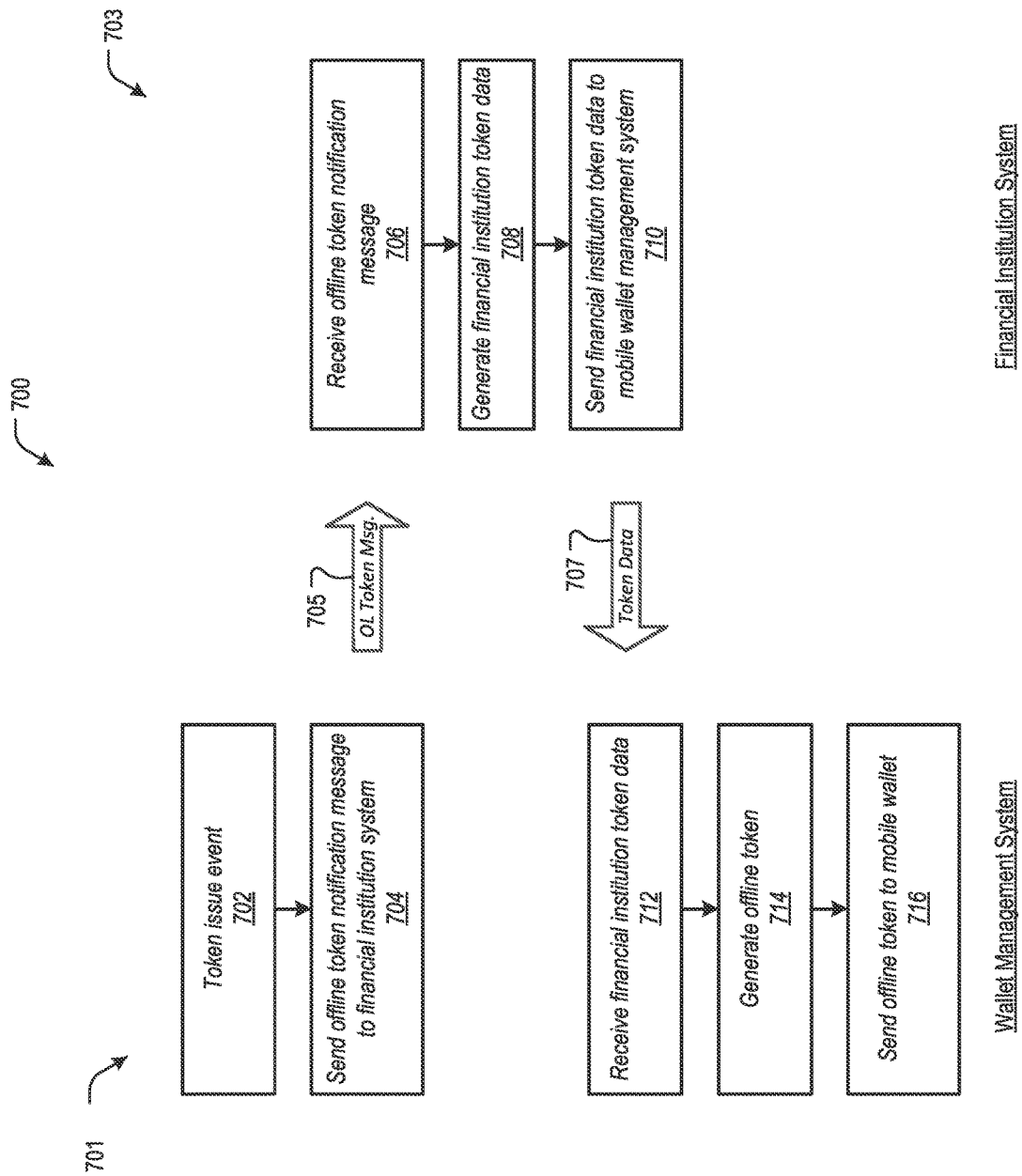
FIG. 7 is a flowchart showing one example of a process flow that may be executed by a wallet management system and a financial institution system to generate an offline token.

In some examples, the financial institution system may be involved in the creation and authentication of an offline token. For example, FIG. 7 is a flowchart showing one example of a process flow 700 that may be executed by a wallet management system and a financial institution system to generate an offline token. The flowchart of FIG. 7 has two columns. A first column 701 includes actions that may be performed by the wallet management system (e.g., the wallet management system 131 or a similar system). A second column 703 includes actions that may be performed by the financial institution system (e.g., a financial management system 140*a*, 140*b*, 140*n*).

At action 702, the wallet management system may determine that a token issue event has occurred. Token issue events may be similar to those described herein with respect to 502. At action 704, the wallet management system may send an offline token issue message 705 to the financial institution system, which may receive the message 705 at action 706. The offline token issue message 705 may comprise data indicating to the financial institution that a mobile wallet is to be issued an offline token. For example, the message 705 may comprise data identifying the mobile wallet and/or an element or elements of the mobile wallet to be included in the offline token. At action 708, the financial institution system may generate financial institution token data. The financial institution token data may be data describing the element or elements of the mobile wallet held at a financial institution implementing the financial institution system. In some examples, the financial institution system may cryptographically sign the financial institution token data.

At action 710, the financial institution system may send a token data message 707 to the wallet management system. The token data message 707 may comprise the financial institution token data. The wallet management system may receive the token data message at action 712. The wallet management system may generate the offline token at action 714. For example, the wallet management system may incorporate the financial institution token data into a raw token and then cryptographically sign all or a portion of the raw token, for example, as described herein above. In some examples, the financial institution token data may additionally or alternatively be incorporated into the offline token after the wallet management system cryptographically signs the offline token. In this way, the financial institution may be able to separate the financial institution token data for authentication without decrypting or otherwise undoing the wallet management systems cryptographic signature. The wallet management system may send the offline token to the mobile wallet at action 716.

Figure 8:
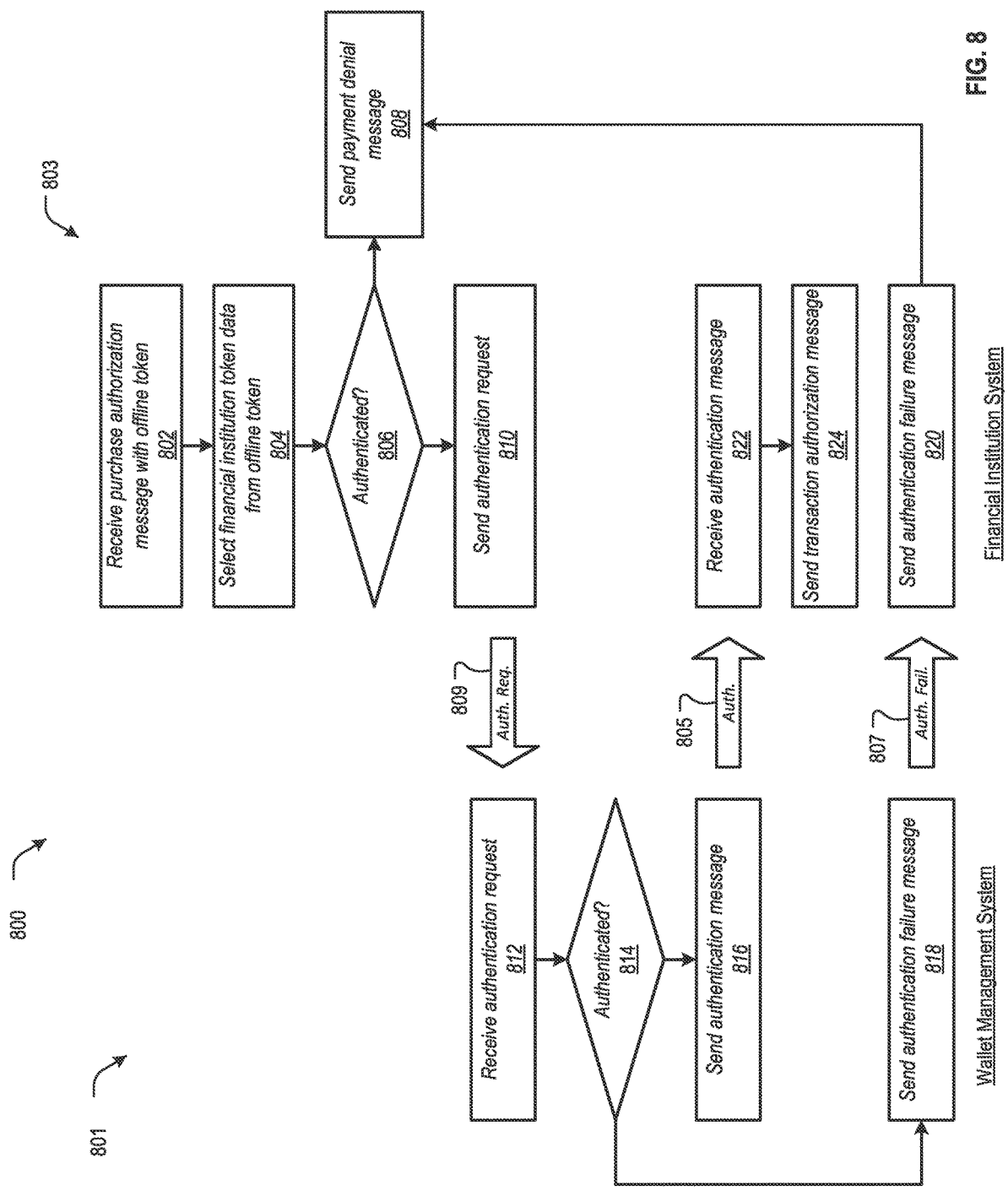
FIG. 8 is a flowchart showing one example of a process flow that may be executed by a wallet management system and a financial institution system to authenticate an offline token generated by the wallet management system and financial institution system, for example, as described in FIG. 7.

FIG. 8 is a flowchart showing one example of a process flow 800 that may be executed by a wallet management system and a financial institution system to authenticate an offline token generated by the wallet management system and financial institution system, for example, as described herein with respect to FIG. 7. Like FIG. 7, FIG. 8 includes two columns. A column 801 includes actions executed by the wallet management system. A column 803 includes actions executed by the financial institution system. At action 802, the financial institution system may receive from a POS device a payment authorization request message that includes an offline token and, optionally, payment data describing the requested payment. At action 804, the financial institution system may select from the offline token financial institution token data. For example, as described above, the offline token may comprise data generated by the wallet management system (e.g., sequence number, mobile wallet identification, element data, payment limitation data, etc.) cryptographically signed by the wallet management system and concatenated with financial institution token data, which may be cryptographically signed by the financial institution system.

At action 806, the financial institution system may determine if the financial institution token data is authenticated. For example, the financial institution system may verify that a cryptographic signature of the financial institution token data is valid. In some examples, the financial institution system may authenticate the financial institution token data by determining whether the financial institution token data (raw or encrypted) matches financial institution token data stored at the financial institution system. If the financial institution token data is not authenticated, the financial institution system may, at action 808, send a payment denial message to the POS device indicating that the requested payment is not authorized. If yes, the financial institution may, at action 810, send to the wallet management system an authentication request message 809. The authentication request message 809 may comprise all or a portion of the offline token. For example, the authentication request message 809 may omit a portion of the offline token corresponding to financial institution token data.

At action 812, the wallet management system may receive the authentication request message. The wallet management system may authenticate the offline token (or portion thereof) included in the authentication request message. Authentication may be performed, for example, as described with respect to the process flow 600. If the offline token is authenticated, the wallet management system may send an authentication message 805 to the financial institution system at action 816. The financial institution system may receive the authentication message at action 822 and send to the POS device a transaction authorization message at action 824. On the other hand, if the offline token is not authenticated at action 814, the wallet management system may, at action 818, send an authentication failure message 807 to the financial institution system. In response, the financial institution system may, at action 820, send to the POS device a payment denial message.

Figure 9:
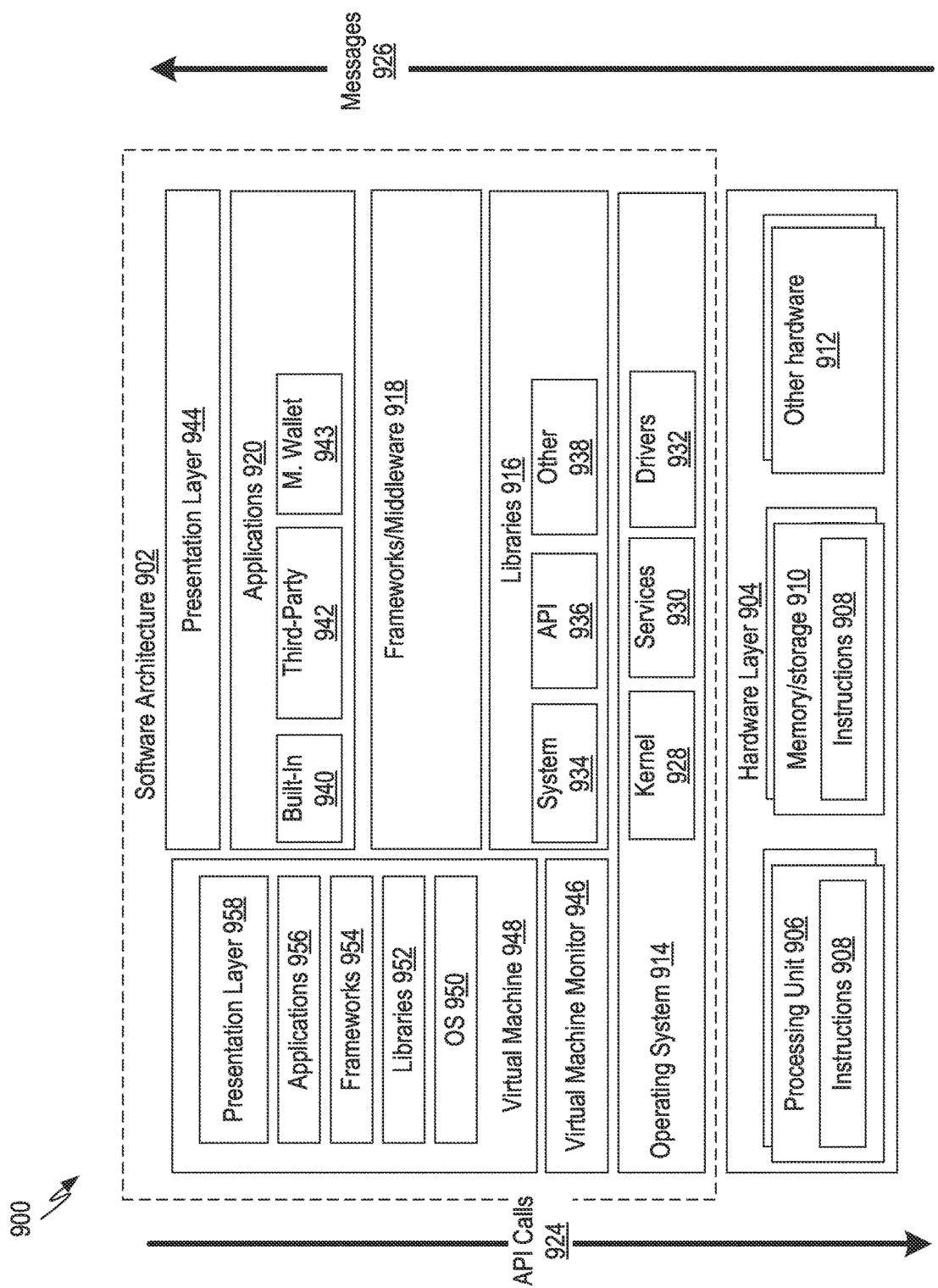
FIG. 9 is a block diagram showing one example of a software architecture for a computing device.

FIG. 9 is a block diagram 900 showing one example of a software architecture 902 for a computing device. The architecture 902 maybe used in conjunction with various hardware architectures, for example, as described herein. FIG. 9 is merely a non-limiting example of a software architecture and many other architectures may be implemented to facilitate the functionality described herein. The software architecture 902 may be executed on hardware such as, for example, a mobile computing device 130*a*, 130*b*, 130*c*, all or part of a wallet management system 131, all or part of a financial institution system 140*a*, 140*b*, 140*n*, all or part of a POS device 150*a*, 150*b*, 150*n*, etc. A representative hardware layer 904 is illustrated and can represent, for example, any of the above referenced computing devices. In some examples, the hardware layer 904 may be implemented according to the architecture 300 of FIG. 3 and/or the architecture 1000 of FIG. 10.

The representative hardware layer 904 comprises one or more processing units 906 having associated executable instructions 908. Executable instructions 908 represent the executable instructions of the software architecture 902, including implementation of the methods, modules, components, and so forth of FIGS. 1-2 and 4-8. Hardware layer 904 also includes memory and/or storage modules 910, which also have executable instructions 908. Hardware layer 904 may also comprise other hardware as indicated by 912 which represents any other hardware of the hardware layer 904, such as the other hardware illustrated as part of hardware architecture 1000.

In the example architecture of FIG. 9, the software 902 may be conceptualized as a stack of layers where each layer provides particular functionality. For example, the software 902 may include layers such as an operating system 914, libraries 916, frameworks/middleware 918, applications 920 and presentation layer 922. Operationally, the applications 920 and/or other components within the layers may invoke application programming interface (API) calls 924 through the software stack and receive a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system 934 libraries (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 includes built-in applications 940 and/or third party applications 942. Examples of representative built-in applications 940 may include, but are not limited to, a contacts application, a browser application, a book reader application, a location application, a media application, a messaging application, and/or a game application. Third party applications 942 may include any of the built in applications as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 942 may invoke the API calls 924 provided by the mobile operating system such as operating system 914 to facilitate functionality described herein. A mobile wallet application 943 may implement the functionality of the mobile wallet described herein. The mobile wallet application may be a built-in or third-party application.

The applications 920 may utilize built in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. For example, the wallet manager system 131 and/or financial institution systems 140*a*, 140*b*, 140*n* may be executed on one or more virtual machines executed at one or more server computing machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/or presentation layer 958. These layers of software architecture executing within the virtual machine 948 can be the same as corresponding layers previously described or may be different.

Figure 10:
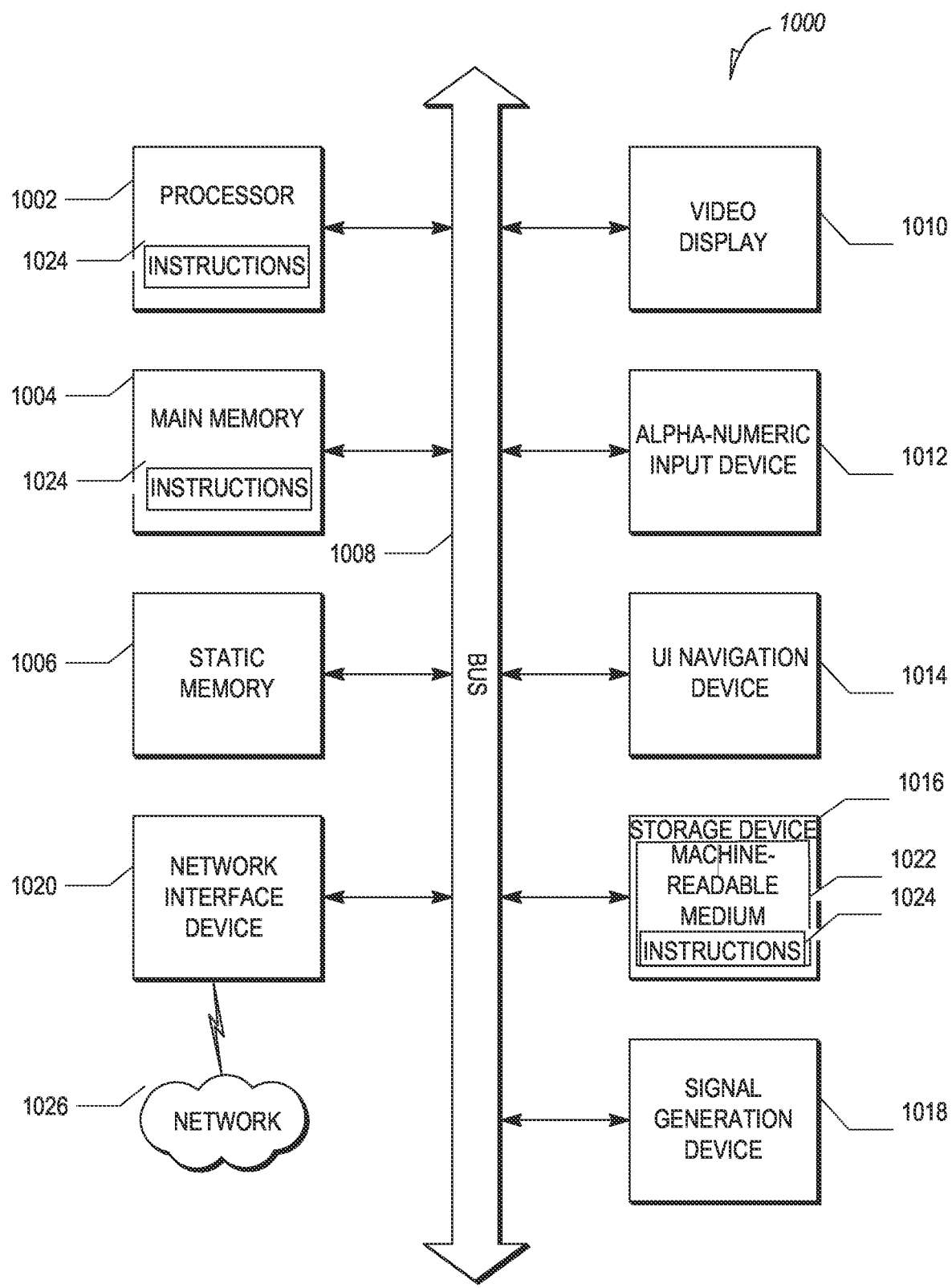
FIG. 10 is a block diagram illustrating a computing device hardware architecture, within which a set or sequence of instructions can be executed to cause the machine to perform examples of any one of the methodologies discussed herein.

FIG. 10 is a block diagram illustrating a computing device hardware architecture 1000, within which a set or sequence of instructions can be executed to cause the machine to perform examples of any one of the methodologies discussed herein. For example, the architecture 1000 may execute the software architecture 902 described with respect to FIG. 9. The architecture 1000 may operate as a standalone device or may be connected (e.g., networked) to other machines. In a networked deployment, the architecture 1000 may operate in the capacity of either a server or a client machine in server-client network environments, or it may act as a peer machine in peer-to-peer (or distributed) network environments. The architecture 1000 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine.

Example architecture 1000 includes a processor unit 1002 comprising at least one processor (e.g., a central processing unit (CPU), a graphics processing unit (GPU) or both, processor cores, compute nodes, etc.). The architecture 1000 may further comprise a main memory 1004 and a static memory 1006, which communicate with each other via a link 1008 (e.g., bus). The architecture 1000 can further include a video display unit 1010, an alphanumeric input device 1012 (e.g., a keyboard), and a user interface (UI) navigation device 1014 (e.g., a mouse). In some examples, the video display unit 1010, input device 1012 and UI navigation device 1014 are incorporated into a touch screen display. The architecture 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 can also reside, completely or at least partially, within the main memory 1004, static memory 1006, and/or within the processor 1002 during execution thereof by the architecture 1000, with the main memory 1004, static memory 1006, and the processor 1002 also constituting machine-readable media. Instructions stored at the machine-readable medium 1022 may include, for example, instructions for implementing the software architecture 902, instructions for executing any of the features described herein, etc.

While the machine-readable medium 1022 is illustrated in an example to be a single medium, the term "machine-readable medium" can include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks, and CD-ROM and DVD-ROM disks.

The instructions 1024 can further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method comprising:
   receiving, at a wallet management system, from a mobile wallet application associated with a mobile computing device, a request for an offline token;
   in response to the receiving:
   generating, at the wallet management system, a first raw token comprising:
   mobile wallet identification data describing the mobile wallet application;
   payment element identification data describing a payment element of the mobile wallet application, the payment element including at least one of a credit card account, a debit card account, or a checking account; and
   sequence data;
   cryptographically sign the first raw token to generate the offline token; and
   transmitting the offline token to the mobile wallet application;
   receiving, at the wallet management system and from a financial institution system, an authentication request message including the offline token and payment data describing a purchase transaction requested by the mobile wallet application, the offline token including a sequence number; and
   in response to receiving the authentication request message:
   making a first determination that the mobile computing device is offline;
   making a second determination that the sequence number matches a next sequence number stored at the wallet management system, the next sequence number stored in association with the mobile wallet application; and
   based on the first determination and the second determination, sending to the financial institution system, an authentication message indicating the offline token is usable for the purchase transaction.

2. The method of claim 1, further comprising:
   before sending to the financial institution system the authentication message, determining that the offline token has been used less than a limited number of time for payment.

3. The method of claim 1, further comprising:
   before sending to the financial institution system the authentication message, determining that the mobile computing device is offline based on a determination that a threshold period of time has passed since a last received heartbeat from the mobile wallet application by comparing a current time to a timestamp of the last received heartbeat.

4. The method of claim 1, further comprising:
   before sending to the financial institution system the authentication message, determining that the wallet management system does not include a lost mobile computing device message indicating that the mobile computing device has been reported missing.

5. The method of claim 1, further comprising:
   before sending to the financial institution system the authentication message, determining that the purchase transaction is for a value less than a payment amount limit condition associated with the offline token.

6. The method of claim 1, further comprising:
   before generating the first raw token, determining that a previous offline token associated with the mobile wallet application has expired.

7. The method of claim 1, further comprising:
   before sending to the financial institution system the authentication message, determining that an expiration date of the offline token has not passed.

8. A non-transitory computer-readable medium comprising instructions, which when executed by at least one processor, configure the at least one processor to perform operations comprising:
   receiving, at a wallet management system, from a mobile wallet application associated with a mobile computing device, a request for an offline token;
   in response to the receiving:
   generating, at the wallet management system, a first raw token comprising:
   mobile wallet identification data describing the mobile wallet application;
   payment element identification data describing a payment element of the mobile wallet application, the payment element including at least one of a credit card account, a debit card account, or a checking account; and
   sequence data;
   cryptographically sign the first raw token to generate the offline token; and
   transmitting the offline token to the mobile wallet application;
   receiving, at the wallet management system and from a financial institution system, an authentication request message including the offline token and payment data describing a purchase transaction requested by the mobile wallet application, the offline token including a sequence number; and
   in response to receiving the authentication request message:
   making a first determination that the mobile computing device is offline;

making a second determination that the sequence number matches a next sequence number stored at the wallet management system, the next sequence number stored in association with the mobile wallet application; and based on the first determination and the second determination, sending to the financial institution system, an authentication message indicating the offline token is usable for the purchase transaction.

9. The non-transitory computer-readable medium of claim 8, wherein the instructions, when executed by the at least one processor, further configure the at least one processor to perform:

before sending to the financial institution system the authentication message, determining that the offline token has been used less than a limited number of time for payment.

10. The non-transitory computer-readable medium of claim 8, wherein the instructions, when executed by the at least one processor, further configure the at least one processor to perform:

before sending to the financial institution system the authentication message, determining that the mobile computing device is offline based on a determination that a threshold period of time has passed since a last received heartbeat from the mobile wallet application by comparing a current time to a timestamp of the last received heartbeat.

11. The non-transitory computer-readable medium of claim 8, wherein the instructions, when executed by the at least one processor, further configure the at least one processor to perform:

before sending to the financial institution system the authentication message, determining that the wallet management system does not include a lost mobile computing device message indicating that the mobile computing device has been reported missing.

12. The non-transitory computer-readable medium of claim 8, wherein the instructions, when executed by the at least one processor, further configure the at least one processor to perform:

before sending to the financial institution system the authentication message, determining that the purchase transaction is for a value less than a payment amount limit condition associated with the offline token.

13. The non-transitory computer-readable medium of claim 8, wherein the instructions, when executed by the at least one processor, further configure the at least one processor to perform:

before generating the first raw token, determining that a previous offline token associated with the mobile wallet application has expired.

14. The non-transitory computer-readable medium of claim 8, wherein the instructions, when executed by the at least one processor, further configure the at least one processor to perform:

before sending to the financial institution system the authentication message, determining that an expiration date of the offline token has not passed.

15. A system comprising:
at least one processor; and
a storage device comprising instructions, which when executed by the at least one processor, configure the at least one processor to perform operations comprising:
receiving, at a wallet management system, from a mobile wallet application associated with a mobile computing device, a request for an offline token;

in response to the receiving:
generating, at the wallet management system, a first raw token comprising:
mobile wallet identification data describing the mobile wallet application;
payment element identification data describing a payment element of the mobile wallet application, the payment element including at least one of a credit card account, a debit card account, or a checking account; and
sequence data;
cryptographically sign the first raw token to generate the offline token; and
transmitting the offline token to the mobile wallet application;

receiving, at the wallet management system and from a financial institution system, an authentication request message including the offline token and payment data describing a purchase transaction requested by the mobile wallet application, the offline token including a sequence number; and in response to receiving the authentication request message:
making a first determination that the mobile computing device is offline;
making a second determination that the sequence number matches a next sequence number stored at the wallet management system, the next sequence number stored in association with the mobile wallet application; and
based on the first determination and the second determination, sending to the financial institution system, an authentication message indicating the offline token is usable for the purchase transaction.

16. The system of claim 15, wherein the instructions, when executed by the at least one processor, further configure the at least one processor to perform:

before sending to the financial institution system the authentication message, determining that the offline token has been used less than a limited number of time for payment.

17. The system of claim 15, wherein the instructions, when executed by the at least one processor, further configure the at least one processor to perform:

before sending to the financial institution system the authentication message, determining that the mobile computing device is offline based on a determination that a threshold period of time has passed since a last received heartbeat from the mobile wallet application by comparing a current time to a timestamp of the last received heartbeat.

18. The system of claim 15, wherein the instructions, when executed by the at least one processor, further configure the at least one processor to perform:

before sending to the financial institution system the authentication message, determining that the wallet management system does not include a lost mobile computing device message indicating that the mobile computing device has been reported missing.

19. The system of claim 15, wherein the instructions, when executed by the at least one processor, further configure the at least one processor to perform:

before sending to the financial institution system the authentication message, determining that the purchase transaction is for a value less than a payment amount limit condition associated with the offline token.

20. The system of claim 15, wherein the instructions, when executed by the at least one processor, further configure the at least one processor to perform:

before generating the first raw token, determining that a previous offline token associated with the mobile wallet application has expired.

* * * * *